United States Patent
Hsieh et al.

(10) Patent No.: US 11,740,339 B2
(45) Date of Patent: Aug. 29, 2023

(54) RANGING SYSTEM

(71) Applicant: National Tsing Hua University, Hsinchu (TW)

(72) Inventors: Ping-Hsuan Hsieh, Hsinchu (TW); Fan-Yi Lin, Hsinchu (TW); Yi-Cheng Lin, Hsinchu (TW); Jun-Da Chen, Hsinchu (TW)

(73) Assignee: National Tsing Hua University, Hsinchu (TW)

( * ) Notice: Subject to any disclaimer, the term of this patent is extended or adjusted under 35 U.S.C. 154(b) by 268 days.

(21) Appl. No.: 17/240,022

(22) Filed: Apr. 26, 2021

(65) Prior Publication Data
US 2022/0342056 A1  Oct. 27, 2022

(51) Int. Cl.
*G01C 3/08* (2006.01)
*G01S 7/4915* (2020.01)
*G01S 7/493* (2006.01)
*G01S 7/4913* (2020.01)

(52) U.S. Cl.
CPC ............ *G01S 7/4915* (2013.01); *G01S 7/493* (2013.01); *G01S 7/4913* (2013.01)

(58) Field of Classification Search
None
See application file for complete search history.

(56) References Cited

U.S. PATENT DOCUMENTS

| | | | |
|---|---|---|---|
| 5,433,208 A | 7/1995 | Lundstrom et al. | |
| 9,097,646 B1 | 8/2015 | Campbell et al. | |
| 2003/0048430 A1 | 3/2003 | Morcom | |
| 2018/0017672 A1* | 1/2018 | Warke | G01S 7/526 |
| 2021/0109219 A1* | 4/2021 | Onori | G01S 7/4808 |

FOREIGN PATENT DOCUMENTS

CN          101124853 B     7/2011

* cited by examiner

*Primary Examiner* — Mark Hellner
(74) *Attorney, Agent, or Firm* — Birch, Stewart, Kolasch & Birch, LLP

(57) ABSTRACT

A ranging system includes: a source generating a wideband incident wave that is transmitted toward a target and that is reflected by the target to form a reflected wave; a feedback detector to detect the reflected wave to generate a detected signal; an operator configured to perform low-pass filtering on the detected signal at an adjustable filtering bandwidth to generate a filtered signal, and calculate cross-correlation of a feedback signal that originates from the filtered signal and a reference signal that corresponds to the incident wave to generate a cross-correlation result; and a controller calculating a distance to the target based on an operation output that originates from the cross-correlation result.

15 Claims, 9 Drawing Sheets

RANGING SYSTEM

FIELD

The disclosure relates to ranging techniques, and more particularly to a ranging system.

BACKGROUND

A lidar system is a system that measures a distance therefrom to a target by illuminating the target with laser light and measuring time of flight the laser light takes to return to the lidar system. The target is detectable by the lidar system when the target is in a ranging dynamic range of the lidar system.

In the lidar system, a higher sampling frequency leads to a finer ranging resolution; and a total number of samples is limited by a given power budget, so a higher sampling frequency leads to a narrower ranging dynamic range. Therefore, given a power budget, the sampling frequency can be lowered to achieve a wider ranging dynamic range, trading off the ranging resolution for the ranging dynamic range, but this may lead to missing target (i.e., the target being undetected). In addition, fine ranging resolution and wide ranging dynamic range cannot be simultaneously achieved without excessive power consumption.

SUMMARY

Therefore, an object of the disclosure is to provide a ranging system that can alleviate at least one drawback of the prior art when adjustable parameters thereof are properly set.

According to the disclosure, the ranging system is adapted to measure a distance therefrom to a target, and includes a source, a feedback detector, an operator and a controller. The source generates an incident wave that is wideband. The incident wave is transmitted toward the target, and is reflected by the target to form a reflected wave. The feedback detector is to detect the reflected wave to generate a detected signal. The operator is coupled to the feedback detector to receive the detected signal therefrom, and is configured to perform low-pass filtering on the detected signal at a preset filtering bandwidth that is adjustable, so as to generate a filtered signal, and calculate cross-correlation of a feedback signal that originates from the filtered signal and a reference signal that corresponds to the incident wave, so as to generate a cross-correlation result. The controller is coupled to the operator to receive therefrom an operation output that originates from the cross-correlation result, and calculates the distance from the ranging system to the target based on the operation output.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
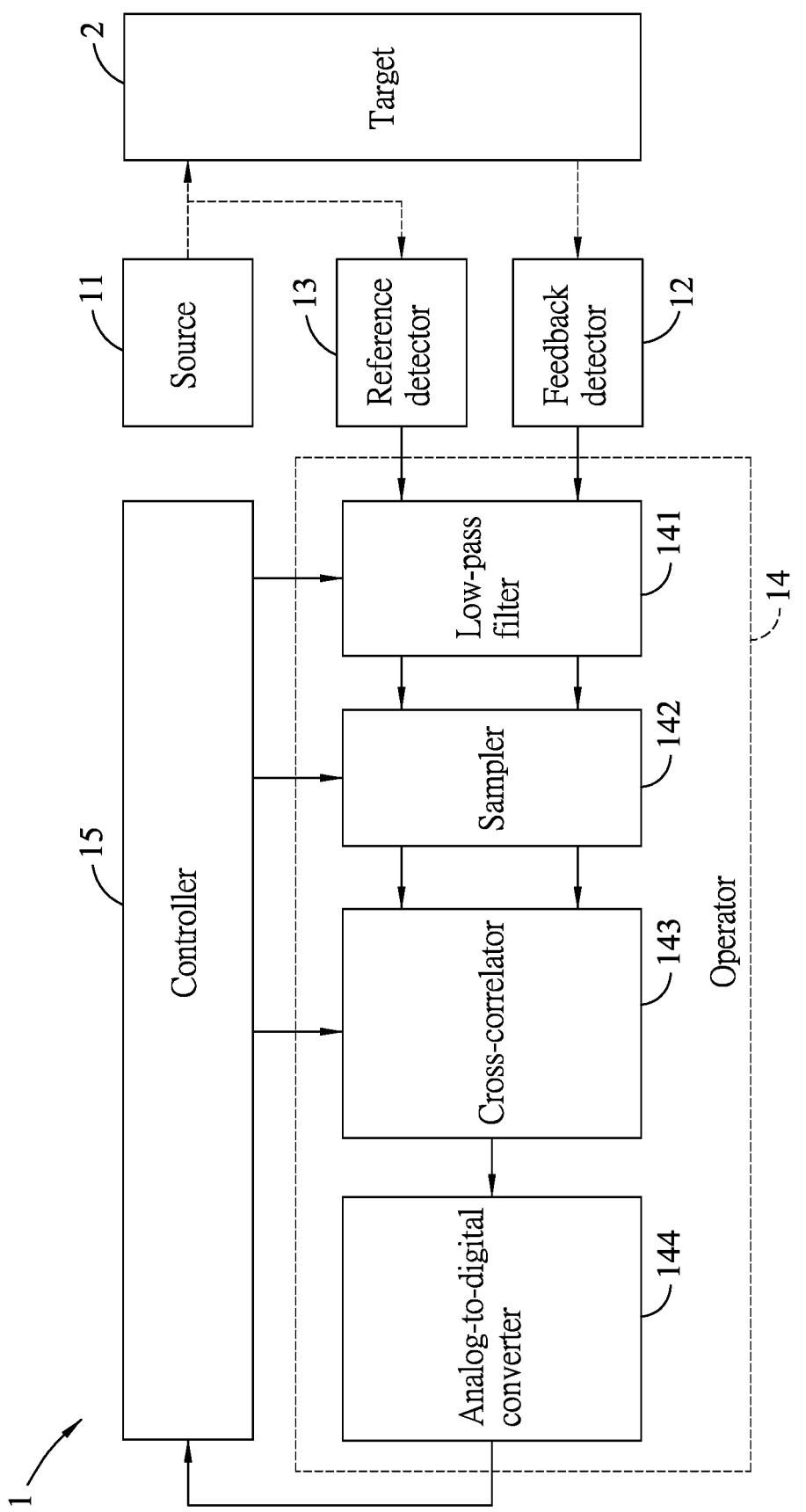
FIG. 1 is a block diagram illustrating a first embodiment of a ranging system according to the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Referring to FIG. 1, a first embodiment of a ranging system 1 according to the disclosure is adapted to measure a distance therefrom to a target 2, and includes a source 11, a feedback detector 12, a reference detector 13, an operator 14 and a controller 15.

The source 11 generates an incident wave (e.g., light, electromagnetic wave or sound) that is wideband, and that may be modulated or unmodulated depending on application requirements. The incident wave is transmitted toward the target 2, and is reflected by the target 2 to form a reflected wave.

The feedback detector 12 is to detect the reflected wave to generate a first detected signal.

The reference detector 13 is to detect the incident wave to generate a second detected signal.

In this embodiment, the source 11 is a light source (e.g., a laser) that generates light to serve as the incident wave, and each of the feedback detector 12 and the reference detector 13 is an optical-to-electrical converter (e.g., a photodiode) that converts a corresponding one of the reflected wave and the incident wave into an electrical signal to serve as a corresponding one of the first detected signal and the second detected signal. However, the disclosure is not limited to the above implementations.

The operator 14 is coupled to the feedback detector 12 and the reference detector 13 to receive the first detected signal and the second detected signal respectively therefrom, and is configured to perform the following: performing low-pass filtering on the first detected signal and the second detected signal at a preset filtering bandwidth that is adjustable, so as to respectively generate a first filtered signal and a second filtered signal; sampling the first filtered signal and the second filtered signal at a preset sampling frequency that is adjustable, so as to generate a feedback signal and a reference signal that respectively originate from the first filtered signal and the second filtered signal and that respectively correspond to the reflected wave and the incident wave; and calculating cross-correlation of the feedback signal and the reference signal with respect to a plurality of delay times distributed in a preset time region to generate a cross-correlation result, wherein the preset time region is optionally adjustable.

The controller 15 is coupled to the operator 14, controls the adjustable parameters of the operator 14 (including the preset filtering bandwidth, the preset sampling frequency and the preset time region), is to receive, from the operator 14, an operation output originating from the cross-correlation result, and calculates the distance from the ranging system 1 to the target 2 based on the operation output.

In this embodiment, the first detected signal and the second detected signal are analog; and the operator 14 includes a low-pass filter 141, a sampler 142 and a cross-correlator 143 that operate in the analog domain, and further includes an analog-to-digital converter 144.

The low-pass filter 141 has an adjustable filtering bandwidth, is coupled to the controller 15, and is controlled by the controller 15 in such a way that the adjustable filtering bandwidth is set to the preset filtering bandwidth. The low-pass filter 141 is further coupled to the feedback detector 12 and the reference detector 13 to receive the first detected signal and the second detected signal respectively therefrom, and performs low-pass filtering on the first detected signal and the second detected signal at the preset filtering bandwidth to respectively generate the first filtered signal and the second filtered signal.

The sampler 142 has an adjustable sampling frequency, is coupled to the controller 15, and is controlled by the controller 15 in such a way that the adjustable sampling frequency is set to the preset sampling frequency. The sampler 142 is further coupled to the low-pass filter 141 to receive the first filtered signal and the second filtered signal therefrom, and samples the first filtered signal and the second filtered signal at the preset sampling frequency to respectively generate the feedback signal and the reference signal.

The cross-correlator 143 has an adjustable time region, is coupled to the controller 15, and is controlled by the controller 15 in such a way that the adjustable time region is set to the preset time region.

The cross-correlator 143 is further coupled to the sampler 142 to receive the feedback signal and the reference signal therefrom, and calculates the cross-correlation of the feedback signal and the reference signal with respect to the delay times distributed in the preset time region so as to generate the cross-correlation result that serves as the operation output. To be specific, for each of the delay times, the cross-correlator 143 delays the reference signal by the delay time to generate a delayed signal, and calculates a dot product of the feedback signal and the delayed signal. The plurality of dot products that respectively correspond to the delay times cooperatively constitute the cross-correlation result.

The analog-to-digital converter 144 is coupled to the cross-correlator 143 to receive the operation output therefrom, is further coupled to the controller 15, and performs analog-to-digital conversion on the operation output to generate a digital representation of the operation output for receipt by the controller 15. The controller 15 calculates the distance from the ranging system 1 to the target 2 based on the digital representation of the operation output.

In a first implementation of this embodiment, the controller 15 controls the low-pass filter 141 and the sampler 142 in such a way that the preset filtering bandwidth is narrower than a signal bandwidth of the incident wave, and that the preset sampling frequency is higher than the preset filtering bandwidth.

Figure 2:
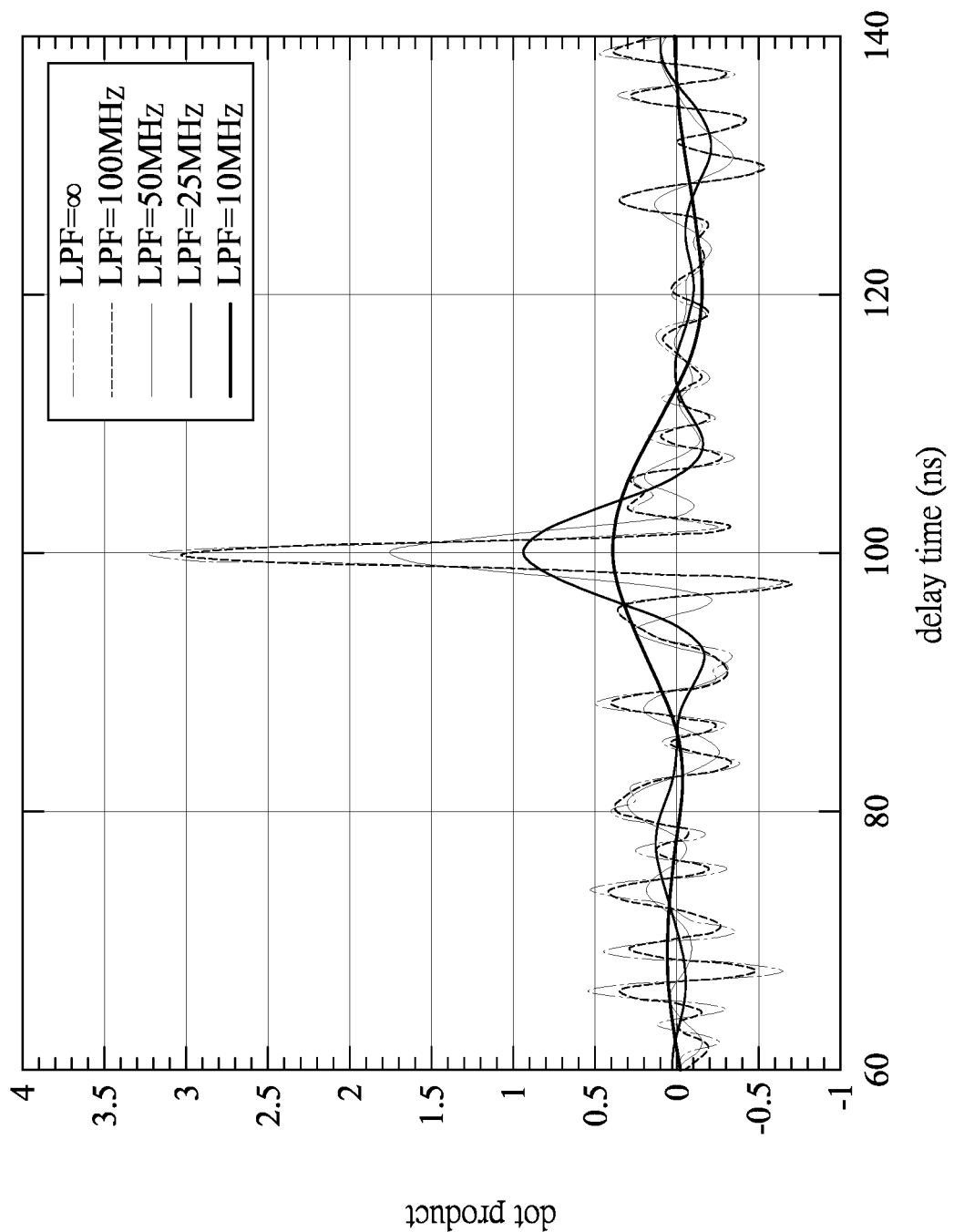
FIG. 2 is a plot illustrating exemplary simulated cross-correlation result of the first embodiment in various conditions with different preset filtering bandwidths.
Figure 3:
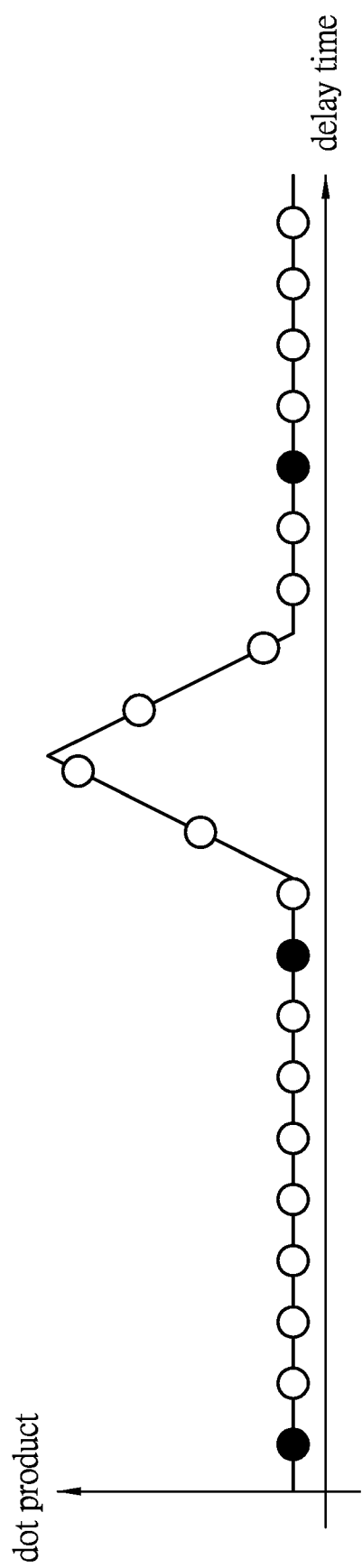
FIG. 3 is a plot illustrating an exemplary cross-correlation result of the first embodiment in various conditions with different preset sampling frequencies.

FIG. 2 illustrates exemplary simulated cross-correlation result of this embodiment in various conditions where the signal bandwidth of the incident wave is 500 MHz and the preset sampling frequency is 5 GHz for all conditions, and where the preset filtering bandwidths for the various conditions are respectively infinity, 100 MHz, 50 MHz, 25 MHz and 10 MHz. In each condition, the delay time corresponding to a maximum dot product is the actual delay time of the reflected wave with respect to the incident wave at the ranging system 1. It can be reasonably determined from FIG. 2 that the lower the preset filtering bandwidth, the wider a pulse of the cross-correlation result containing the maximum dot product. In addition, as shown in FIG. 3, when the preset sampling frequency is higher than the preset filtering bandwidth, the cross-correlation result (i.e., a combination of solid dots and hollow dots) would not miss the aforesaid pulse, so target detection is ensured (i.e., the target 2 is detected); and when the preset sampling frequency is lower than the preset filtering bandwidth, the cross-correlation result (i.e., the solid dots) may entirely miss the aforesaid pulse that should have appeared, leading to missing target (i.e., the target 2 is not detected). In the first implementation of this embodiment, by causing the preset filtering bandwidth to be lower than the preset sampling frequency, the target 2 would be detected even if the preset sampling frequency is reduced for the purpose of widening a ranging dynamic range of the ranging system 1.

Figure 4:
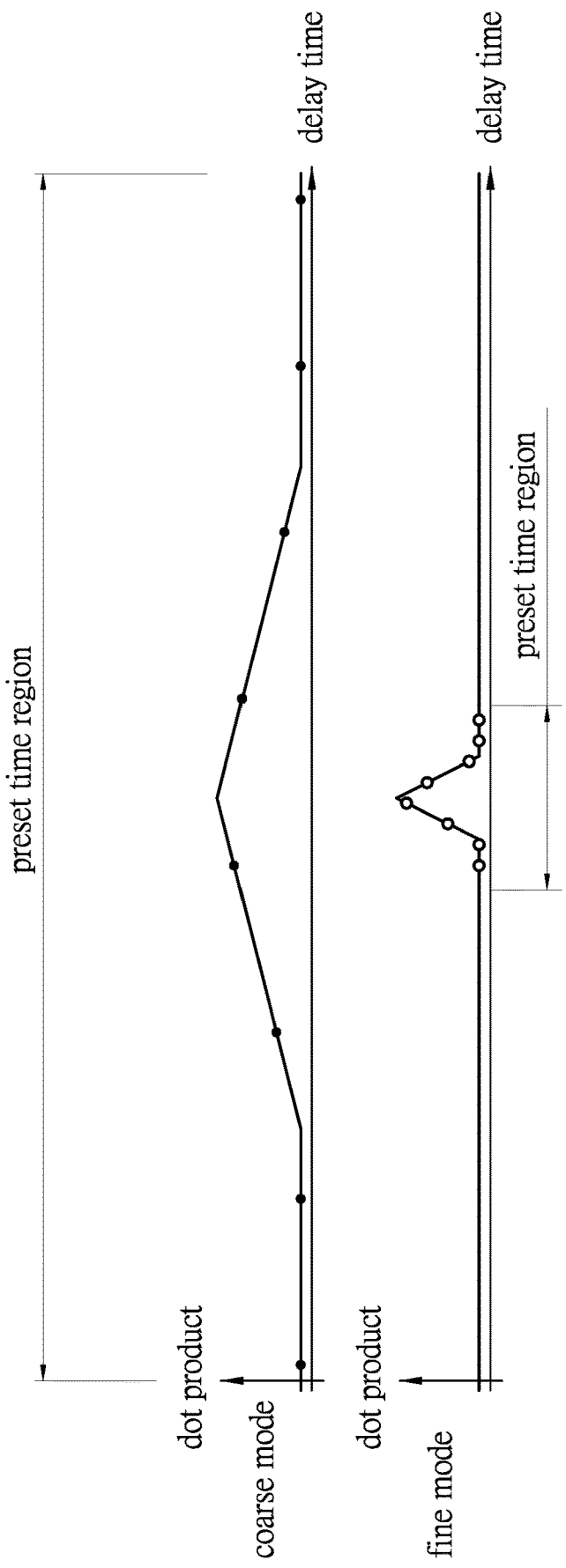
FIG. 4 is a plot illustrating an exemplary cross-correlation result of the first embodiment in a coarse mode and a fine mode.

Referring to FIGS. 1 and 4, in a second implementation of this embodiment, the ranging system 1 sequentially operates in a coarse mode and a fine mode. In the coarse mode, the controller 15 controls the low-pass filter 141, the sampler 142 and the cross-correlator 143 in such a way that the preset filtering bandwidth, the preset sampling frequency and the preset time region are respectively equal to a first filtering bandwidth, a first sampling frequency and a first time region. The first filtering bandwidth is narrower than the signal bandwidth of the incident electromagnetic signal. The first sampling frequency is higher than the first filtering bandwidth. Moreover, the controller 15 obtains, based on the operation output, a coarse delay time of the reflected wave with respect to the incident wave at the ranging system 1. In the fine mode, the controller 15 controls the low-pass filter 141, the sampler 142 and the cross-correlator 143 in such a way that the preset filtering bandwidth, the preset sampling frequency and the preset time region are respectively equal to a second filtering bandwidth, a second sampling frequency and a second time region. The second filtering bandwidth is wider than the first filtering bandwidth. The second sampling frequency is higher than the second filtering bandwidth and the first sampling frequency. The second time region is narrower than the first time region and is around the coarse delay time as shown in FIG. 4. Moreover, the controller 15 obtains, based on the operation output, a fine delay time of the reflected wave with respect to the incident wave at the ranging system 1, and calculates the distance from the ranging system 1 to the target 2 based on the fine delay time.

In the second implementation of this embodiment, since the preset sampling frequency is higher in the fine mode than in the coarse mode, and since the preset time region is narrower in the fine mode than in the coarse mode, the ranging system 1 can have a wider ranging dynamic range in the coarse mode, and can have a finer ranging resolution in the fine mode. In addition, the preset sampling frequency and the preset time region can be such that a total number of samples (i.e., the dot products) which are included in the cross-correlation result does not exceed an upper limit posed by a predetermined power budget in both of the coarse mode and the fine mode, so the ranging system 1 can have an overall fine ranging resolution across a wide ranging dynamic range without excessive power consumption.

Figure 5:
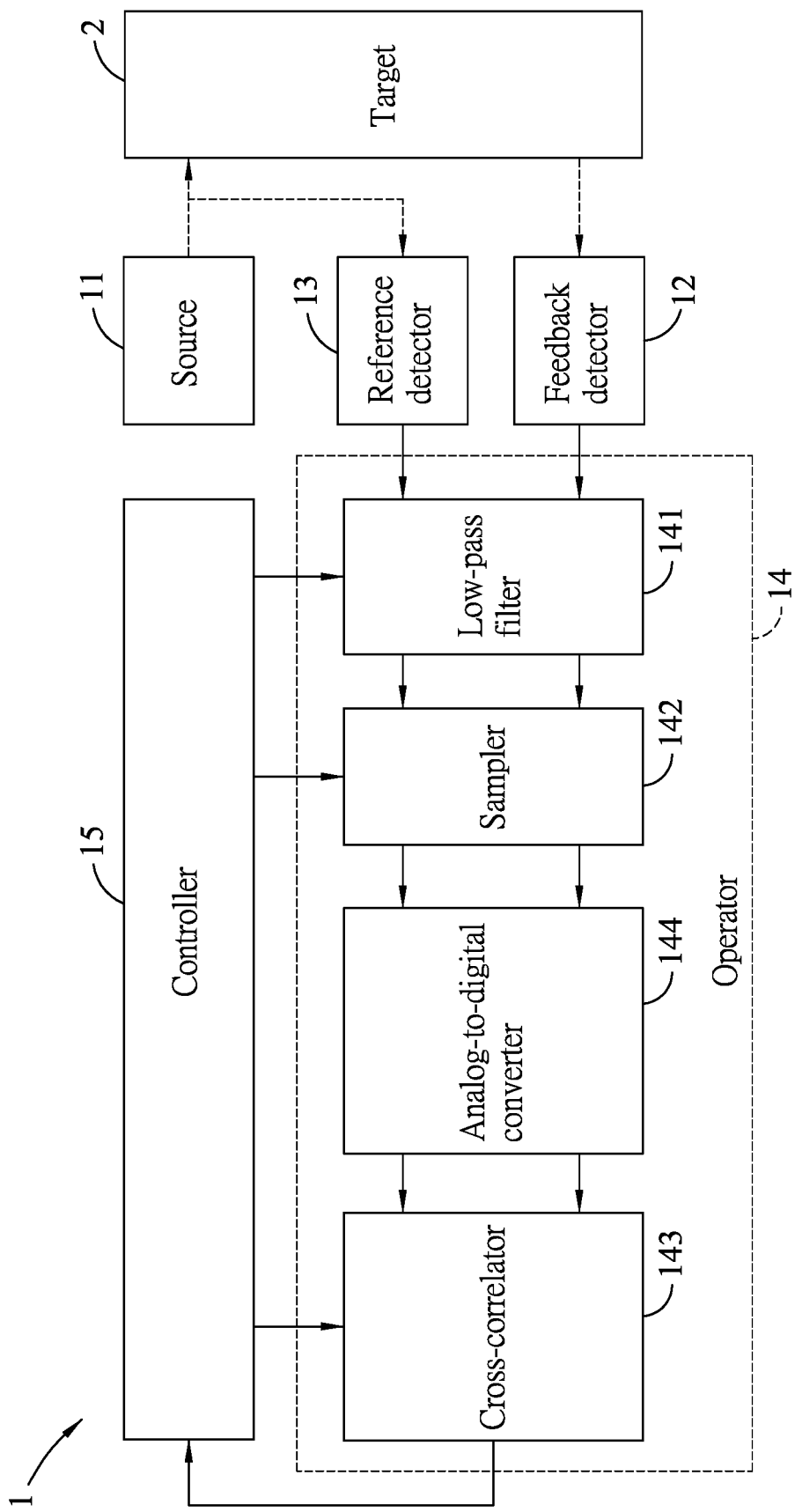
FIG. 5 is a block diagram illustrating a second embodiment of the ranging system according to the disclosure.

Referring to FIG. 5, a second embodiment of the ranging system 1 according to the disclosure is similar to the first embodiment, but differs from the first embodiment in that the cross-correlator 143 operates in the digital domain.

In the second embodiment, the analog-to-digital converter 144 is coupled to the sampler 142 to receive the feedback signal and the reference signal therefrom, and performs analog-to-digital conversion on the feedback signal and the reference signal to generate a digital representation of the feedback signal and a digital representation of the reference signal. The cross-correlator 143 is coupled to the analog-to-digital converter 144 to receive the digital representation of the feedback signal and the digital representation of the reference signal therefrom, and is further coupled to the controller 15. The cross-correlator 143 calculates the cross-correlation of the digital representation of the feedback signal and the digital representation of the reference signal with respect to the delay times distributed in the preset time region so as to generate the cross-correlation result, which serves as the operation output, for receipt by the controller 15. The controller 15 calculates the distance from the ranging system 1 to the target 2 based on the operation output.

Figure 6:
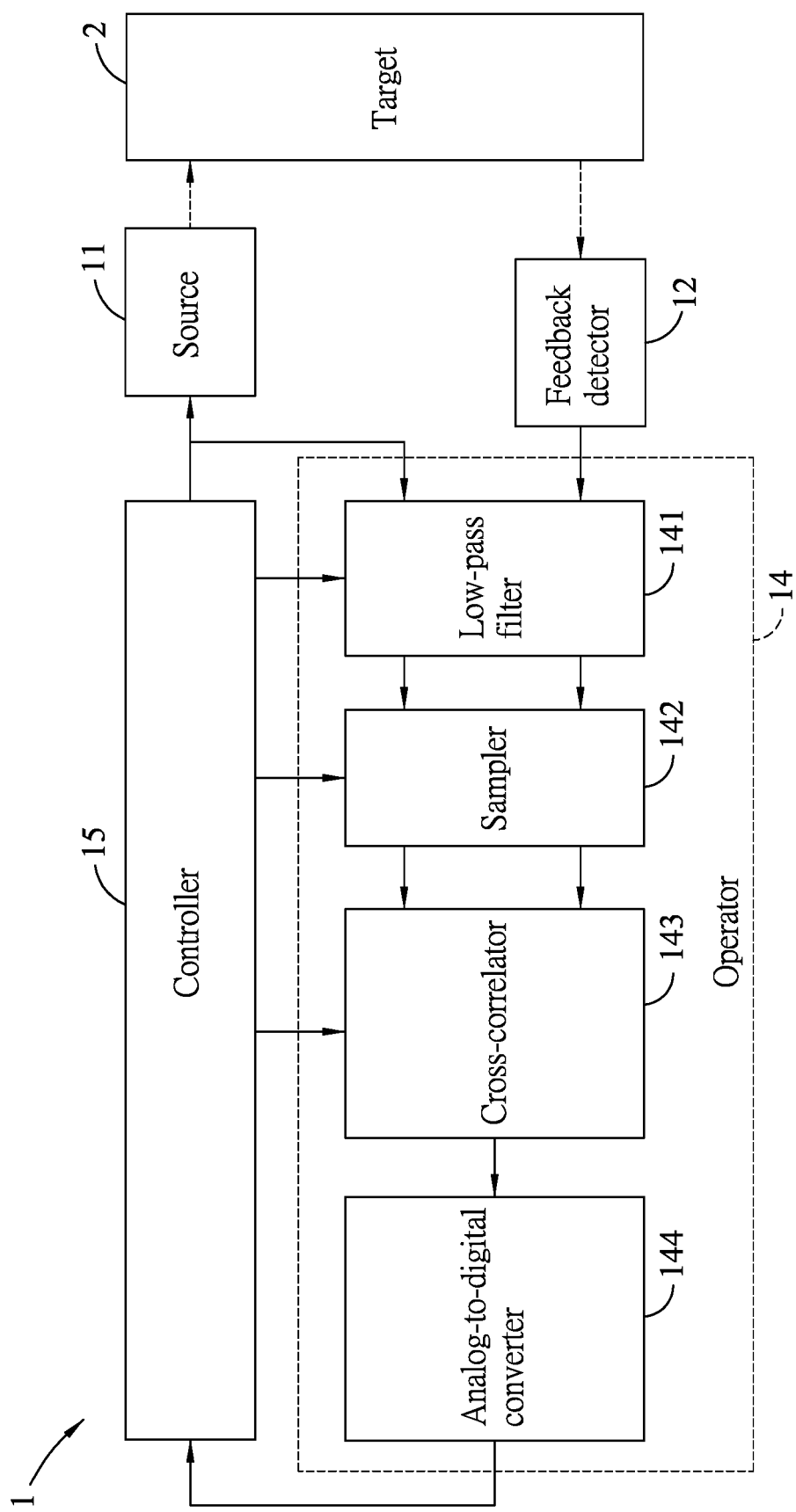
FIG. 6 is a block diagram illustrating a third embodiment of the ranging system according to the disclosure.

Referring to FIG. 6, a third embodiment of the ranging system 1 according to the disclosure is similar to the first embodiment, but differs from the first embodiment in that: (a) the reference detector 13 (see FIG. 1) is omitted; (b) the controller 15 further generates a source signal that is analog; (c) the source 11 is coupled to the controller 15 to receive the source signal therefrom, and generates the incident wave based on the source signal; and (d) the low-pass filter 141 is to receive the source signal from the controller 15, and performs low-pass filtering on the source signal at the preset filtering bandwidth so as to generate the second filtered signal.

Figure 7:
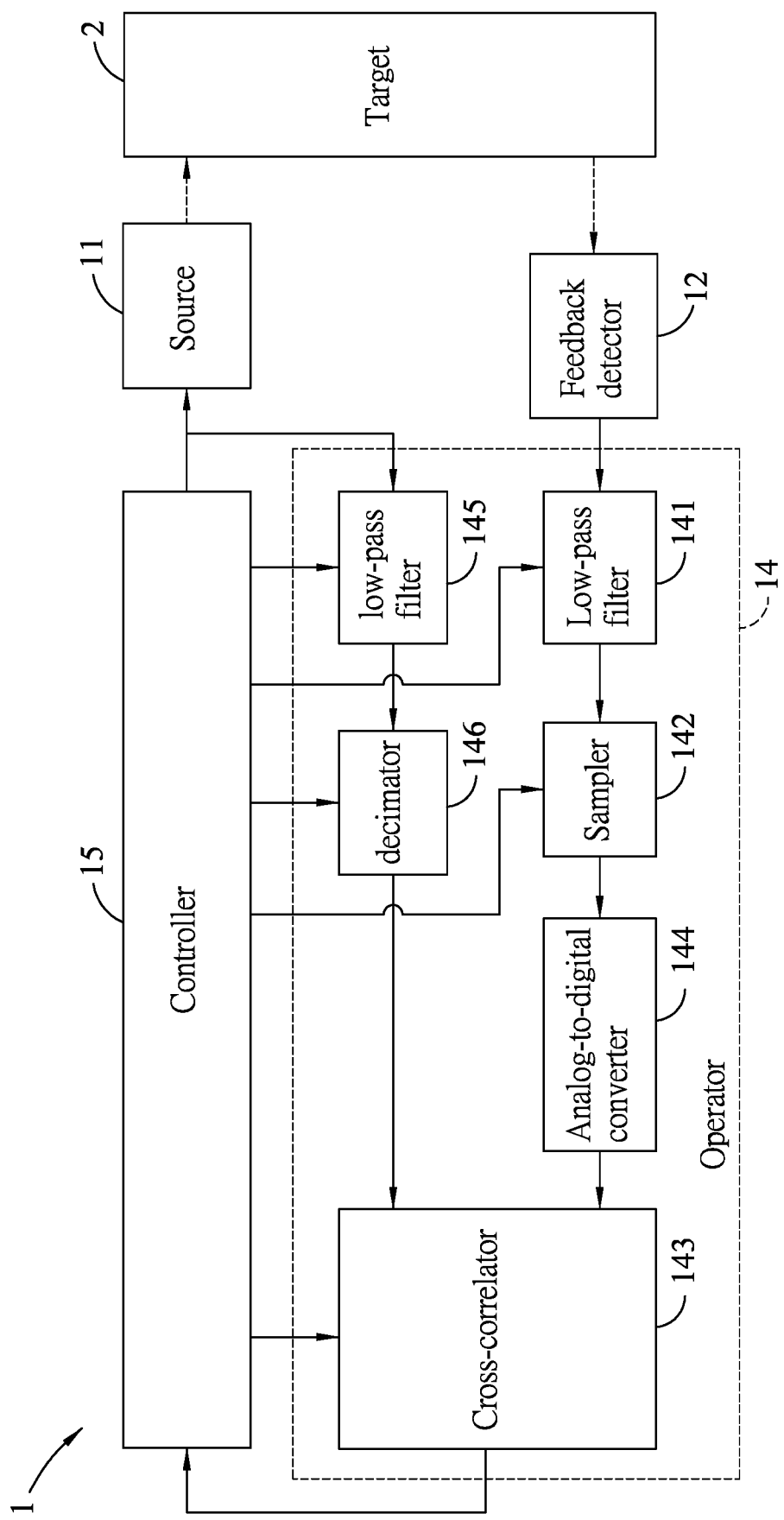
FIG. 7 is a block diagram illustrating a fourth embodiment of the ranging system according to the disclosure.

Referring to FIG. 7, a fourth embodiment of the ranging system 1 according to the disclosure is similar to the second embodiment, but differs from the second embodiment in that: (a) the reference detector 13 (see FIG. 5) is omitted; (b) the controller 15 further generates a source signal that is digital; (c) the source 11 is coupled to the controller 15 to receive the source signal therefrom, and generates the incident wave based on the source signal; and (d) the operator 14 further includes another low-pass filter 145 and a decimator 146 which operate in the digital domain.

In the fourth embodiment, the second filtered signal is generated by the low-pass filter 145, instead of by the low-pass filter 141, and the reference signal is generated by the decimator 146, instead of by the sampler 142. To be specific, the low-pass filter 145 has an adjustable filtering bandwidth, is coupled to the controller 15, and is controlled by the controller 15 in such a way that the adjustable filtering bandwidth is set to the preset filtering bandwidth. The low-pass filter 145 is to receive the source signal from the controller 15, and performs low-pass filtering on the source signal at the preset filtering bandwidth so as to generate the second filtered signal. The decimator 146 has an adjustable sampling frequency, is coupled to the controller 15, and is controlled by the controller 15 in such a way that the adjustable sampling frequency is set to the preset sampling frequency. The decimator 146 is further coupled to the low-pass filter 145 and the cross-correlator 143, is to receive the second filtered signal from the low-pass filter 145, and downsamples the second filtered signal to generate the reference signal having a sampling rate equal to the preset sampling frequency for receipt by the cross-correlator 143. The cross-correlator 143 calculates the cross-correlation of the digital representation of the feedback signal and the reference signal with respect to the delay times that are distributed in the preset time region, so as to generate the cross-correlation result.

Figure 8:
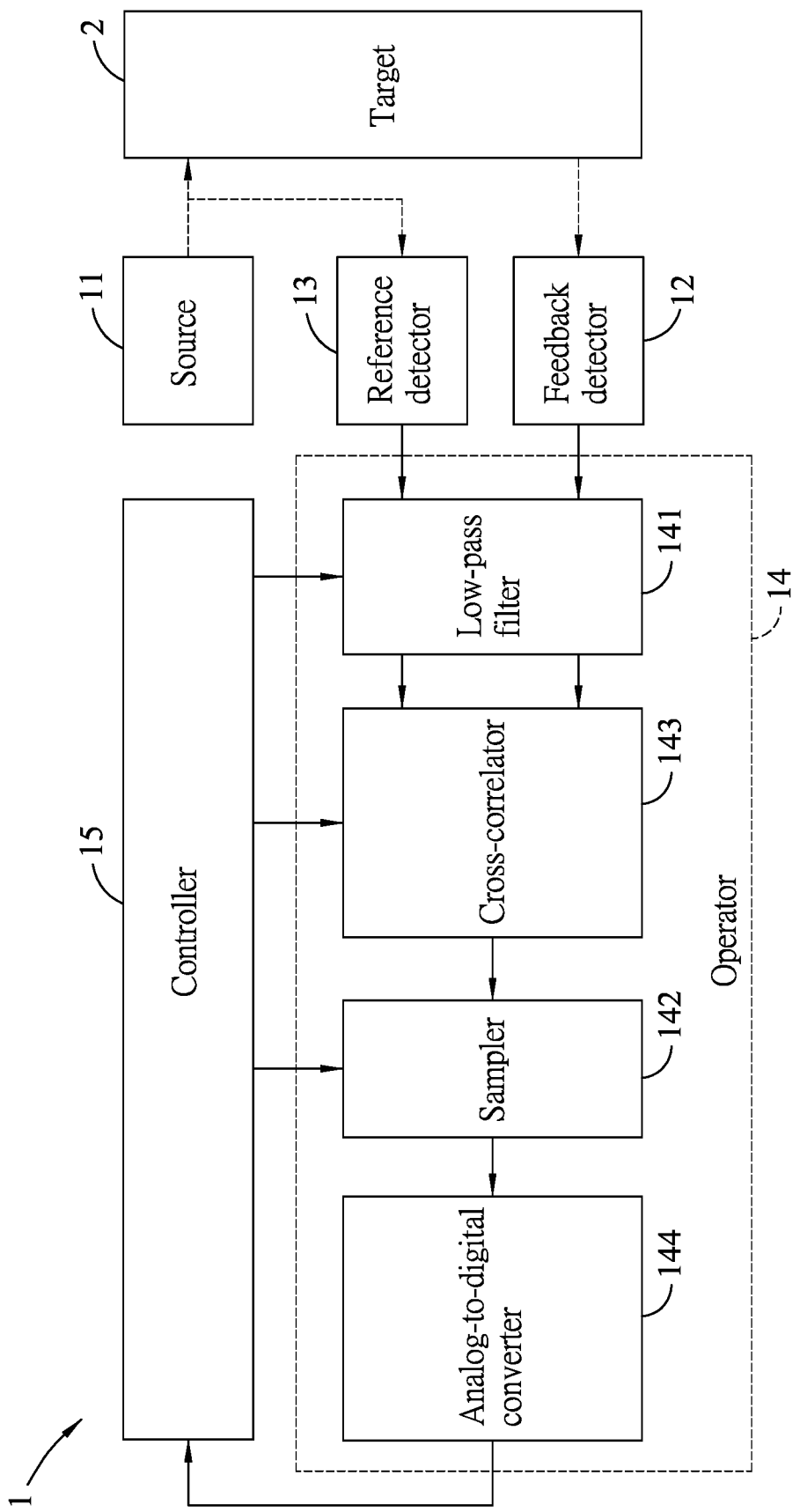
FIG. 8 is a block diagram illustrating a fifth embodiment of the ranging system according to the disclosure.

Referring to FIG. 8, a fifth embodiment of the ranging system 1 according to the disclosure is similar to the first embodiment, but differs from the first embodiment in that the operator 14 is configured to perform the following: performing low-pass filtering on the first detected signal and the second detected signal at the preset filtering bandwidth to respectively generate the first filtered signal and the second filtered signal that respectively serve as the feedback signal and the reference signal; calculating the cross-correlation of the feedback signal and the reference signal with respect to the delay times distributed in the preset time region to generate the cross-correlation result; and sampling the cross-correlation result at the preset sampling frequency to generate the operation output.

In the fifth embodiment, the cross-correlator 143 is coupled to the low-pass filter 141 to receive the feedback signal and the reference signal therefrom, and calculates the cross-correlation of the feedback signal and the reference signal with respect to the delay times distributed in the preset time region to generate the cross-correlation result. The sampler 142 is coupled to the cross-correlator 143 to receive the cross-correlation result therefrom, and samples the cross-correlation result at the preset sampling frequency to generate the operation output. The analog-to-digital converter 144 is coupled to the sampler 142 to receive the operation output therefrom, and performs analog-to-digital conversion on the operation output to generate a digital representation of the operation output for receipt by the controller 15. The controller 15 calculates the distance from the ranging system 1 to the target 2 based on the digital representation of the operation output.

Figure 9:
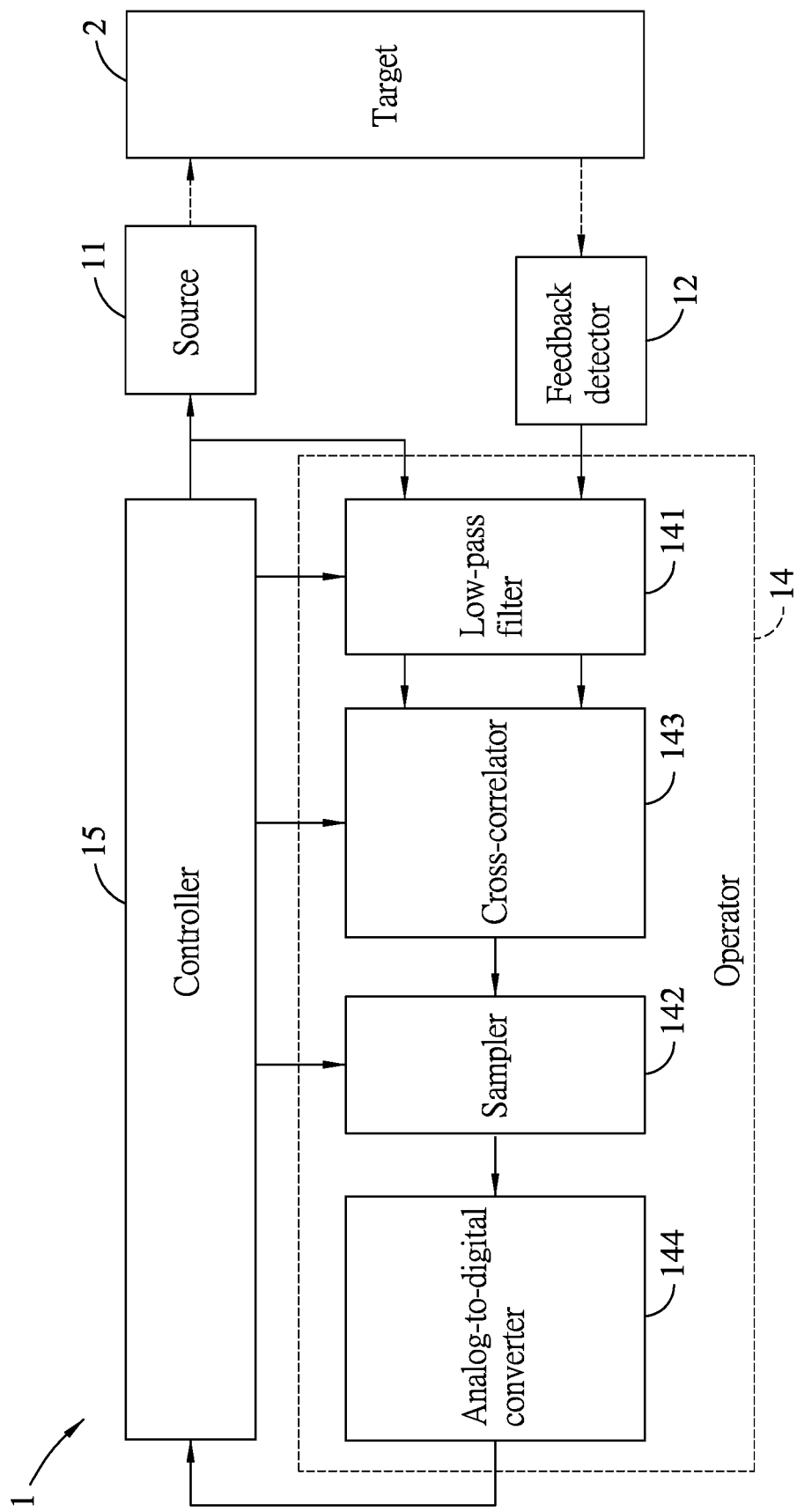
FIG. 9 is a block diagram illustrating a sixth embodiment of the ranging system according to the disclosure.

Referring to FIG. 9, a sixth embodiment of the ranging system 1 according to the disclosure is similar to the fifth embodiment, but differs from the fifth embodiment in that: (a) the reference detector 13 (see FIG. 8) is omitted; (b) the controller 15 further generates a source signal that is analog; (c) the source 11 is coupled to the controller 15 to receive the source signal therefrom, and generates the incident wave based on the source signal; and (d) the low-pass filter 141 is to receive the source signal from the controller 15, and performs low-pass filtering on the source signal at the preset filtering bandwidth so as to generate the reference signal.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that the disclosure is not limited to the disclosed embodiments but is intended to cover various arrangements included within the spirit and scope of the broadest interpretation so as to encompass all such modifications and equivalent arrangements.

What is claimed is:

1. A ranging system adapted to measure a distance therefrom to a target, and comprising:
a source generating an incident wave that is wideband, the incident wave being transmitted toward the target, and being reflected by the target to form a reflected wave;
a feedback detector to detect the reflected wave to generate a first detected signal;
an operator coupled to said feedback detector to receive the first detected signal therefrom, and configured to
perform low-pass filtering on the first detected signal at a preset filtering bandwidth that is adjustable, so as to generate a first filtered signal, and
calculate cross-correlation of a feedback signal that originates from the first filtered signal and a reference signal that corresponds to the incident wave, so as to generate a cross-correlation result; and
a controller coupled to said operator to receive therefrom an operation output that originates from the cross-correlation result, and calculating the distance from said ranging system to the target based on the operation output;
wherein said operator is further configured to sample the first filtered signal at a preset sampling frequency that is adjustable, so as to generate the feedback signal; and
wherein the cross-correlation result serves as the operation output.

2. The ranging system of claim 1, wherein said operator calculates the cross-correlation with respect to a plurality of delay times that are distributed in a preset time region which is adjustable.

3. The ranging system of claim 1, wherein the preset sampling frequency is higher than the preset filtering bandwidth.

4. The ranging system of claim 1, being operable in a coarse mode and a fine mode, wherein:
in the coarse mode, said controller controlling said operator in such a way that the preset filtering bandwidth and the preset sampling frequency are respectively equal to a first filtering bandwidth and a first sampling frequency; and
in the fine mode, said controller controlling said operator in such a way that the preset filtering bandwidth and the preset sampling frequency are respectively equal to a second filtering bandwidth and a second sampling frequency, the second filtering bandwidth being wider than the first filtering bandwidth, the second sampling frequency being higher than the first sampling frequency.

5. The ranging system of claim 4, wherein:
said operator calculates the cross-correlation with respect to a plurality of delay times that are distributed in a preset time region which is adjustable;
in the coarse mode, said controller controlling said operator in such a way that the preset time region is equal to a first time region, and obtaining, based on the operation output, a coarse delay time of the reflected wave with respect to the incident wave at said ranging system; and
in the fine mode, said controller controlling said operator in such a way that the preset time region is equal to a second time region, obtaining, based on the operation output, a fine delay time of the reflected wave with respect to the incident wave at said ranging system, and calculating the distance from said ranging system to the target based on the fine delay time, the second time region being narrower than the first time region and being around the coarse delay time.

6. The ranging system of claim 1, further comprising:
a reference detector to detect the incident wave so as to generate a second detected signal;
wherein said operator is further coupled to said reference detector to receive the second detected signal therefrom, and is further configured to
perform low-pass filtering on the second detected signal at the preset filtering bandwidth, so as to generate a second filtered signal, and
sample the second filtered signal at the preset sampling frequency, so as to generate the reference signal.

7. The ranging system of claim 1, wherein:
said source is to receive a source signal, and generates the incident wave based on the source signal; and
said operator is to further receive the source signal, and is further configured to
perform low-pass filtering on the source signal at the preset filtering bandwidth, so as to generate a second filtered signal, and
sample the second filtered signal at the preset sampling frequency, so as to generate the reference signal.

8. The ranging system of claim 1, wherein:
said source is to receive a source signal, and generates the incident wave based on the source signal; and
said operator is to further receive the source signal, and is further configured to
perform low-pass filtering on the source signal at the preset filtering bandwidth, so as to generate a second filtered signal, and
downsample the second filtered signal to generate the reference signal having a sampling frequency equal to the preset sampling frequency.

9. A ranging system adapted to measure a distance therefrom to a target, and comprising:
a source generating an incident wave that is wideband, the incident wave being transmitted toward the target, and being reflected by the target to form a reflected wave;
a feedback detector to detect the reflected wave to generate a first detected signal;
an operator coupled to said feedback detector to receive the first detected signal therefrom, and configured to
perform low-pass filtering on the first detected signal at a preset filtering bandwidth that is adjustable, so as to generate a first filtered signal, and
calculate cross-correlation of a feedback signal that originates from the first filtered signal and a reference signal that corresponds to the incident wave, so as to generate a cross-correlation result; and
a controller coupled to said operator to receive therefrom an operation output that originates from the cross-correlation result, and calculating the distance from said ranging system to the target based on the operation output;
wherein the first filtered signal serves as the feedback signal; and
wherein said operator is further configured to sample the cross-correlation result at a preset sampling frequency that is adjustable, so as to generate the operation output.

10. The ranging system of claim 9, further comprising:
a reference detector to detect the incident wave so as to generate a second detected signal;

wherein said operator is further coupled to said reference detector to receive the second detected signal therefrom, and is further configured to perform low-pass filtering on the second detected signal at the preset filtering bandwidth, so as to generate the reference signal.

11. The ranging system of claim 9, wherein:
said source is to receive a source signal, and generates the incident wave based on the source signal; and
said operator is to further receive the source signal, and is further configured to perform low-pass filtering on the source signal at the preset filtering bandwidth, so as to generate the reference signal.

12. The ranging system of claim 9, wherein said operator calculates the cross-correlation with respect to a plurality of delay times that are distributed in a preset time region which is adjustable.

13. The ranging system of claim 9, wherein the preset sampling frequency is higher than the preset filtering bandwidth.

14. The ranging system of claim 9, being operable in a coarse mode and a fine mode, wherein:
in the coarse mode, said controller controlling said operator in such a way that the preset filtering bandwidth and the preset sampling frequency are respectively equal to a first filtering bandwidth and a first sampling frequency; and
in the fine mode, said controller controlling said operator in such a way that the preset filtering bandwidth and the preset sampling frequency are respectively equal to a second filtering bandwidth and a second sampling frequency, the second filtering bandwidth being wider than the first filtering bandwidth, the second sampling frequency being higher than the first sampling frequency.

15. The ranging system of claim 14, wherein:
said operator calculates the cross-correlation with respect to a plurality of delay times that are distributed in a preset time region which is adjustable;
in the coarse mode, said controller controlling said operator in such a way that the preset time region is equal to a first time region, and obtaining, based on the operation output, a coarse delay time of the reflected wave with respect to the incident wave at said ranging system; and
in the fine mode, said controller controlling said operator in such a way that the preset time region is equal to a second time region, obtaining, based on the operation output, a fine delay time of the reflected wave with respect to the incident wave at said ranging system, and calculating the distance from said ranging system to the target based on the fine delay time, the second time region being narrower than the first time region and being around the coarse delay time.

* * * * *